July 21, 1970  W. KUNZE  3,521,539
PHOTOGRAPHIC CAMERA
Filed Nov. 29, 1967  2 Sheets—Sheet 1

INVENTOR:
WILHELM KUNZE
BY Michael S. Striker
Attorney

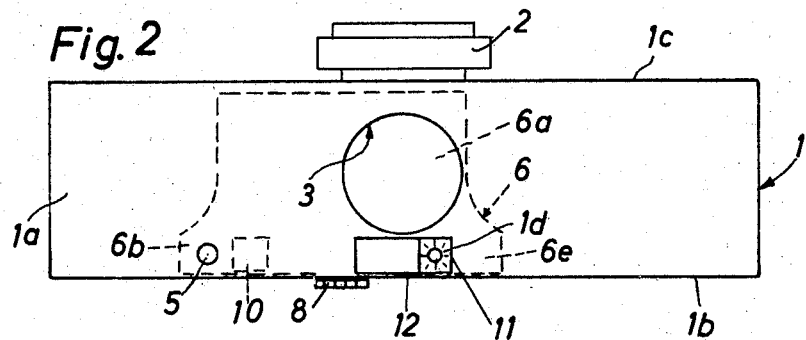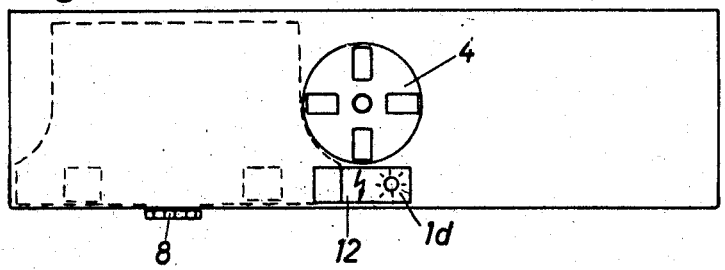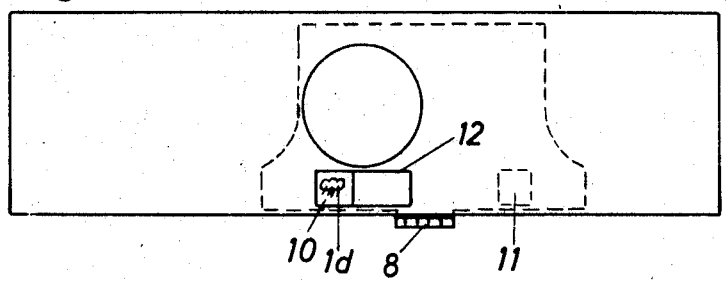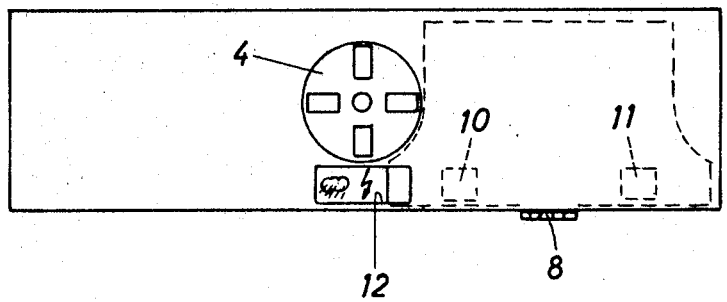

United States Patent Office 3,521,539
Patented July 21, 1970

1

3,521,539
PHOTOGRAPHIC CAMERA
Wilhelm Kunze, Calw, Germany, assignor to Agfa-Gevaert Aktiengesellschaft, Leverkusen, Germany
Filed Nov. 29, 1967, Ser. No. 686,415
Claims priority, application Germany, Apr. 29, 1967,
R 45,918
Int. Cl. G03b 9/70, 19/00
U.S. Cl. 95—11                                10 Claims

ABSTRACT OF THE DISCLOSURE

A slide which is reciprocable below the top panel of the housing in a camera can cover or expose a socket for flash bulbs or multiple flash bulb holders and is coupled to the shutter to select the exposure time. Appropriate symbols provided on the housing or on the slide are observable through a window in the top panel to indicate the positions of the slide and the setting of the shutter. That exposure time which is satisfactory for exposures with artificial illumination of the subject can be set for exposures in daylight when the intensity of scene light is low.

BACKGROUND OF THE INVENTION

The present invention relates to photographic cameras, and more particularly to improvements in photographic cameras which can be used with detachable flash units or analogous artificial illuminating arrangements.

It is already known to provide a photographic camera with a shutter which is automatically adjusted to furnish an appropriate exposure time in response to attachment of a flash unit or in response to insertion of a flash bulb into a socket in or on the camera housing. A drawback of such cameras is that the same exposure time cannot be set for operation in daylight, and particularly that the flash unit cannot be used in broad daylight when the automatically determined exposure time would bring about overexposure of film frames.

SUMMARY OF THE INVENTION

It is an object of my invention to provide a simple, compact and relatively inexpensive camera wherein the shutter is automatically adjusted when the camera is ready to make exposures only in artificial light and wherein the illuminating arrangement can be used with equal advantage for exposures in broad daylight or in dim daylight.

Another object of the invention is to provide a camera wherein the shutter speeds are indicated by simple symbols which can be readily understood by persons to whom the indication of shutter speeds in seconds or fractions of seconds is of no assistance for proper setting of exposure values.

A further object of the invention is to provide a camera wherein the attachment of a flash unit or a like illuminating arrangement can be prevented or permitted by a device which also serves as a means for adjusting the shutter.

A concomitant object of the invention is to provide a camera which, though intended primarily for beginners and less advanced amateurs, can be used by skilled photographers and is capable of making exposures under normal lighting conditions as well as under circumstances requiring other than routine setting of the shutter.

A further object of the invention is to provide a camera which can be used in connection with conventional illuminating arrangements.

My invention is embodied in a photographic camera which comprises a housing for adjustable shutter means which can furnish two or more exposure times, an illuminating arrangement including a member permanently mounted in or on the housing and at least one second

2 member which must be coupled to the permanently mounted member in order to place the illuminating arrangement in operative condition, and shutter adjusting means mounted in the housing and movable between at least one first position and at least one second position to respectively permit or prevent access to the permanently mounted member and to respectively set the shutter means for at least one first and at least one second exposure time.

The adjusting means and/or the housing may be provided with simple symbols serving to indicate various positions of the adjusting means and the setting of the shutter means.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a top plan view of the camera showing the adjusting means in a first intermediate position;

FIG. 3 is a similar top plan view but showing the adjusting means in a first end position;

FIG. 4 is a similar top plan view but showing the adjusting means in a second intermediate position;

FIG. 5 is a similar top plan view but showing the adjusting means in a second end position.

DESCRIPTION OF THE PREFERRED EMBODIMENT

Figure 1:
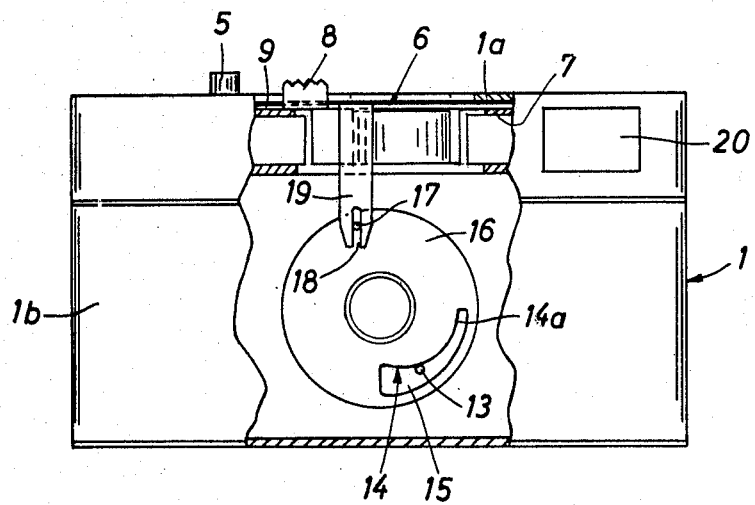
FIG. 1 is a somewhat schematic rear elevational view of a still camera which embodies one form of my invention and wherein a portion of the housing is broken away.

Referring first to FIGS. 1 to 5, there is shown a still camera which comprises a block-shaped or box-shaped housing 1 having a top panel 1a, a rear panel 1b and a front panel 1c. The latter carries a lens mount 2. The top panel 1a has a substantially centrally located aperture 3 provided above an indexible socket 4 which can receive the plug of a multiple flash bulb holder (not shown) of the type known as "Flashcube" or the lower part of a single flash bulb. It is also possible to replace the socket 4 with a conventional accessory shoe for a detachable illuminating arrangement, e.g., an electronic flash unit or a flash unit which uses bulbs.

The shutter release trigger is shown at 5. This trigger can actuate an adjustable shutter a portion of which is shown in FIG. 1 and which can furnish at least two exposure times including a relatively long exposure time for operation with artificial illumination of the subject and a relatively short exposure time for operation in broad daylight with or without additional illumination by a flash bulb or the like.

In the embodiment of FIGS. 1 to 5, the shutter is arranged to furnish three exposure times including a shortest exposure time of $\frac{1}{125}$ of a second for operation in broad daylight with additional illumination of the subject or scene by a flash bulb or an electronic illuminating arrangement (FIG. 3), an exposure time of $\frac{1}{60}$ of a second for operation in daylight without artificial illumination (FIG. 2), and a short exposure of $\frac{1}{30}$ of a second for operation in daylight on a cloudy day or for operation only with artificial illumination of the subject (FIGS. 4 and 5).

The means for adjusting the shutter and for simultaneously performing at least one additional function comprises an adjusting member in the form of a slide 6 which is located below the top panel 1a and is guided by rails 7 or similar guide members provided in the housing 1. The slide 6 is movable back and forth in the longitudinal direction of the top panel 1a and can overlap or expose the socket 4, depending on the selected exposure time. A serrated handgrip portion or knob 8 of the slide 6 extends outwardly through an elongated slot 9 provided in the rear panel 1b adjacent to the top panel 1a, and the serrated part of the knob 8 extends upwardly beyond the top panel to be more readily grasped by a finger. The slot 9 can be provided in the top panel 1a adjacent to the rear panel 1b, in the top panel adjacent to the front panel 1c (see FIG. 6) or in the front panel adjacent to the top panel.

The adjusting slide 6 has a plate-like central portion 6a and two extensions 6b, 6c extending in opposite directions adjacent to the rear panel 1b. Two windows 10, 11 provided in the slide between the extensions 6b, 6c can be moved into registry with a window 12 in the top panel 1a rearwardly of the aperture 3. The housing 1 has an intermediate wall 1d located below the slide 6 and provided with three simple symbols behind the window 12. These symbols include a sun symbol indicating exposures in broad daylight, a thunderbolt symbol indicating exposures with artificial illumination of the subject or scene, and a cloud symbol indicating exposures in daylight when the intensity of scene light is low.

The manner in which the adjusting slide 6 can set the shutter is illustrated in FIG. 1. The shutter is represented by a pin-shaped follower 13 of the retard mechanism which can be displaced by a cam face 14 bounding one side of an arcuate cutout 15 provided in a disk-shaped selector 16 which is rotatable in the housing 1 about the optical axis of the objective. The selector 16 has an eccentric pin 17 extending into a vertical slot 18 provided in an arm 19 of the adjusting slide 6. A portion 14a of the cam face 14 has a curvature whose center is located on the axis of the selector 16 so that the follower 13 does not change its position and the exposure time remains unchanged when the follower tracks the portion 14a. This takes place when the adjusting slide 6 moves from the position shown in FIG. 4 to that shown in FIG. 5 or vice versa.

FIG. 1 further shows a view finder 20 in the top portion of the housing 1.

The operation is as follows:

When the user wishes to make an exposure in broad daylight without artificial illumination of the subject, the slide 6 is moved by means of its knob 8 to a first intermediate position shown in FIG. 2. The window 11 then registers with the right-hand portion of the window 12 and permits observation of the sun symbol. The central portion 6a of the slide 6 overlies the socket 4 below the aperture 3 so that the user cannot attach the separable part of the illuminating arrangement. During movement of the knob 8 to the position shown in FIG. 2, the arm 19 of the slide moves the pin 17 to rotate the selector 16 so that the cam face 14 adjusts the position of the follower 13 and selects an exposure time of $\frac{1}{60}$ second. Such exposure time is normally satisfactory for exposures in daylight.

If the user wishes to make an exposure in broad daylight with artificial illumination of the subject, the knob 8 is moved to the left-hand end position shown in FIG. 3 in which it abuts against the surface at the left-hand end of the slot 9 and/or in which the left-hand extension 6b abuts against the left-hand side wall of the housing 1. The central portion 6a of the slide 6 is then moved away from registry with the aperture 3 so that the user can attach a multiple flash bulb holder to the socket 4. At the same time, the right-hand extensions 6c of the slide 6 overlies the cloud symbol on the wall 1d but permits observation of the other two symbols so that the operator knows that the camera is ready to make exposures in daylight when the intensity of scene light is very high and/or in broad daylight with additional illumination of the scene or subject by a flash bulb or the like. During movement of the knob 8 to the left-hand end position of FIG. 3, the arm 19 of the slide causes the cam face 14 to adjust the follower 13 so that the shutter is ready to furnish an exposure time of $\frac{1}{125}$ of a second.

To make an exposure on a cloudy day or when the intensity of scene light is rather low, the user moves the knob 8 to the position shown in FIG. 4 whereby the arm 19 causes the selector 16 to set an exposure time of $\frac{1}{30}$ second by moving the portion 14a of the cam face 14 into engagement with the follower 13. The left-hand window 10 registers with a portion of the window 12 and permits observation of the cloud symbol but the central portion 6a of the slide 6 overlies the socket 4 to prevent attachment of a multiple flash bulb holder or the like. This is the second intermediate position of the slide 6.

When the exposure is to be made in daylight and/or with artificial illumination of the subject (or example, because the intensity of natural light is too low), the knob 8 is moved to the end position of FIG. 5 in which it abuts against the surface at the right-hand end of the slot and/or in which the extension 6c abuts against the right-hand side wall of the housing 1. The exposure time remains unchanged because the follower 13 tracks the portion 14a of the cam face 14. The left-hand extension 6b overlies the sun symbol but exposes the other two symbols, and the central portion 6a is moved away from registry with the aperture 3 so that the user can attach a multiple flash bulb holder.

In each of its four positions, the slide 6 covers at least one of the three symbols on the wall 1d of the housing 1.

It is clear that the cam face 14 can be altered so that the exposure time selected in response to movement of the knob 8 to the position shown in FIG. 5 is not the same as the exposure time in the position of FIG. 4. Moreover, the shutter can be adjusted to select three or more exposure times for operation in daylight with or without artificial illumination or a single exposure for operation in daylight with or without flash or the like. Thus, the left-hand portion of the cam face 14 can have a curvature whose center is located on the axis of the selector 16 so that the exposure time does not change when the knob 8 is moved from the position of FIG. 2 to the position of FIG. 3, or vice versa.

Figure 6:
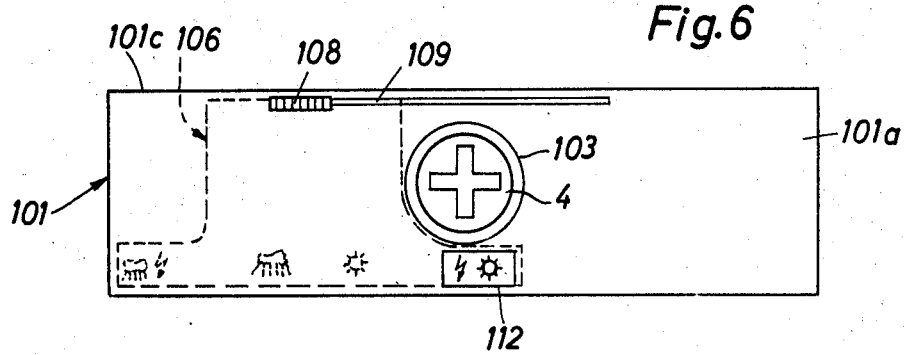
FIG. 6 is a schematic top plan view of a second still camera.

Referring finally to FIG. 6, there is shown a portion of a slightly modified camera having a housing 101 whose top wall 101a is provided with a centrally located aperture 103 and with a window 112. The symbols are provided on the slide 106 which is movable behind the top wall 101a. The latter has an elongated slot 109 adjacent to the front wall 101c for an upwardly extending handgrip member or knob 108 of the slide 106. The manner in which the slide 106 can adjust the shutter is the same as shown in FIG. 1. When moved to the right-hand end position, the slide moves its two leftmost symbols (a cloud and a thunderbolt) into registry with the window 112. In its two intermediate positions, the slide 106 places a cloud symbol or a sun symbol into registry with the window 112. In the illustrated left-hand end position, the slide 106 maintains a sun symbol and a thunderbolt symbol in registry with the window 112 so that the user knows that he can use artificial illumination or that he can make an exposure without such artificial illumination. The central portion of the slide 106 registers with the aperture 103 in both intermediate positions.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

What is claimed is:

1. In a photographic camera, a combination comprising a housing; adjustable shutter means mounted in said housing and arranged to furnish a plurality of exposure times; an illuminating arrangement including a member mounted on said housing; and one-piece shutter adjusting means mounted in said housing and movable by hand between at least one first position in which the shutter means furnishes at least one first exposure time and said adjusting means directly prevents access to said member of said illuminating arrangement and at least one second position in which the shutter means furnishes at least one second exposure time and said adjusting means affords access to said member.

2. A combination as defined in claim 1, wherein said housing has a panel provided with an aperture, said member being located in said housing behind said aperture and said adjusting means being movable in said housing between said panel and said member into and from registry with said aperture.

3. A combination as defined in claim 2, wherein said panel has a window and said housing is provided with symbols behind said window and indicating various positions of said adjusting means and various settings of said shutter means, said adjusting means being arranged to permit observation of appropriate symbols in said positions thereof.

4. A combination as defined in claim 3, wherein said adjusting means is provided with at least one window which registers with the window of said panel in one position of said adjusting means.

5. A combination as defined in claim 1, wherein said adjusting means is movable between several first positions in each of which said shutter means furnishes a different exposure time.

6. A combination as defined in claim 1, wherein said adjusting means is movable between several second positions in each of which said shutter means furnishes a different exposure time.

7. A combination as defined in claim 1, wherein said adjusting means comprises a slide having a handgrip portion and said housing comprises a top panel, a front panel and a rear panel, one of said panels having an elongated slot for said handgrip portion.

8. A combination as defined in claim 1, wherein said adjusting means is movable between two first and two second positions and wherein the exposure time furnished by said shutter means in one of said first positions is the same as that furnished in one of said second positions.

9. A combination as defined in claim 1, wherein said housing has a top panel and said adjusting means is a slide which is reciprocable below said top panel.

10. A combination as defined in claim 1, further comprising a pin-and-slot connection between said shutter means and said adjusting means.

References Cited

UNITED STATES PATENTS

| | | | |
|---|---|---|---|
| 3,107,593 | 10/1963 | Hausmann et al. | 95—11 |
| 3,181,443 | 5/1965 | Lareau et al. | 95—11.5 |
| 3,204,541 | 9/1965 | Frost et al. | |
| 3,223,010 | 12/1965 | Rentschler et al. | 95—11 |
| 3,260,181 | 7/1966 | Hennig et al. | |
| 3,286,611 | 11/1966 | Lange. | |
| 3,443,497 | 5/1969 | Bihlmaier | 240—1.3 XR |

NORTON ANSHER, Primary Examiner

R. P. GREINER, Assistant Examiner

U.S. Cl. X.R.

95—11.5